Figure 1:
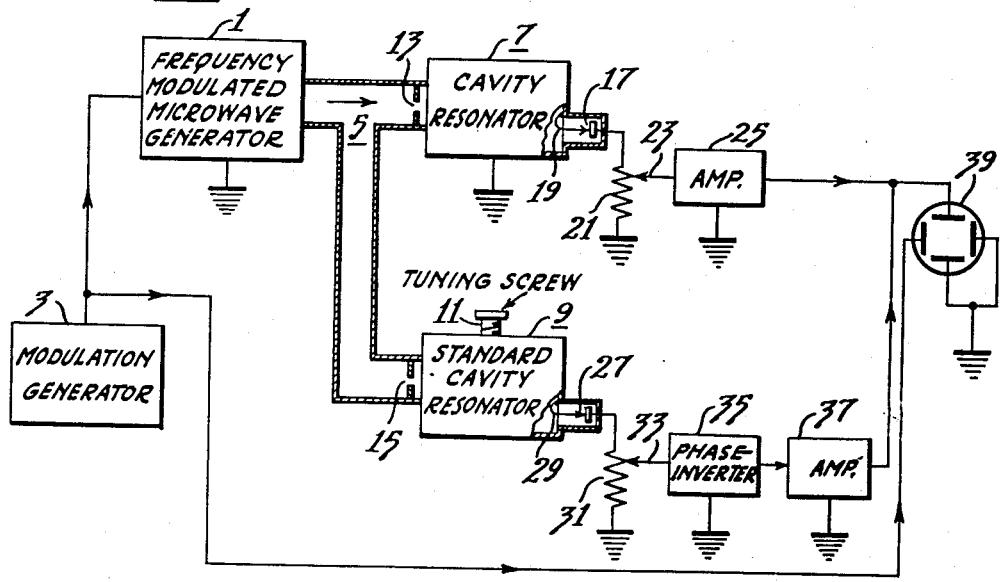

Jan. 1, 1952

R. L. SPROULL 2,580,968

METHOD OF AND MEANS FOR MEASURING
MICROWAVE FREQUENCIES
Filed Nov. 28, 1945

INVENTOR.
Robert L. Sproull
BY
ATTORNEY

Patented Jan. 1, 1952

2,580,968

UNITED STATES PATENT OFFICE 2,580,968

METHOD OF AND MEANS FOR MEASURING MICROWAVE FREQUENCIES

Robert L. Sproull, Penns Neck, N. J., assignor to Radio Corporation of America, a corporation of Delaware Application November 28, 1945, Serial No. 631,435

11 Claims. (Cl. 175—183)

This invention relates generally to microwave frequency measurement and more particularly to an improved method of and means for measuring the frequency characteristics of microwave resonators.

Heretofore, measurement of the resonant frequency characteristics of microwave devices has been dependent upon the ability to determine a point of maximum amplitude of the resonance characteristic of the microwave device. Since such a point of maximum amplitude has zero slope, accurate determination of the frequency value has been directly dependent upon the Q of the device and of the frequency stability and calibration of the microwave source employed for such measurements. Since the frequency stability of microwave oscillators usually is poor, it is desirable to avoid reliance on the constancy of frequency of the signal generator for frequency measurements in the microwave region.

The instant invention contemplates the use of a "sweep frequency" technique wherein the frequency of the microwave generator is modulated at a sixty cycle or other low frequency rate. If the frequency band of the modulated microwave generator covers the resonant frequency band of the microwave device to be measured, direct indication may be provided upon an oscilloscope of the resonant characteristics of the device as a function of frequency. The absolute measurement accuracy of such a system probably does not exceed plus or minus .1 percent. However, if a preselected microwave device such as a cavity resonator is initially calibrated by this or other known methods, it is possible to measure the difference frequency between the calibrated and the unknown device to an accuracy of .0001 percent.

In accordance with the invention the frequency modulated microwave generator is coupled loosely to both the calibrated and the unknown microwave resonant devices. The modulation frequency band of the modulated generator is selected to cover the resonant characteristics of both microwave devices. Separate microwave detectors, such as microwave crystals, are loosely coupled into both of the microwave devices to derive currents which vary in amplitude as a function of frequency in accordance with the resonant characteristics of each of the microwave devices. If the detected currents are substantially balanced in amplitude and of opposite polarity, they may be combined and applied to the vertical deflecting elements of a cathode ray oscilloscope to provide a very accurate indication of the relative resonant characteristics of the two devices as a function of the modulated microwave frequency. If both microwave resonant devices have approximately the same value of Q, an accurate indication of the frequency difference between them may be obtained with an accuracy of better than one part in a million. The pattern on the oscilloscope screen is characteristic of the difference in response of the two resonant devices as a function of the modulating voltage applied to the microwave generator.

Among the objects of the invention are to provide an improved method of and means for measuring microwave frequencies. Another object is to provide an improved method of and means for measuring the resonant characteristics of microwave devices substantially independently of frequency instability in the microwave driving source. A further object of the invention is to provide an improved method of and means for measuring the difference in frequency between two or more microwave resonant devices to an extremely high degree of accuracy. An additional object of the invention is to provide an improved method of and means for visually indicating the resonant characteristics of a tuned microwave device. A still further object of the invention is to provide an improved sweep frequency microwave measuring system wherein the relative resonant characteristics of two microwave devices are indicated as a function of the modulation frequency of a modulated microwave source which excites both devices. Another object is to provide an improved method of and means for measuring by sweep frequency oscillographic means the frequency difference between two microwave resonant devices excited by a frequency modulated microwave generator.

Figure 2:
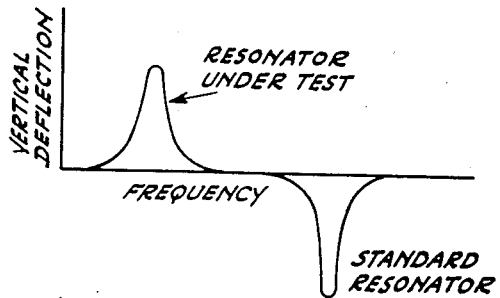
Figure 3:
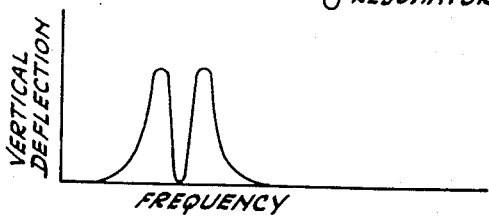
Figure 4:
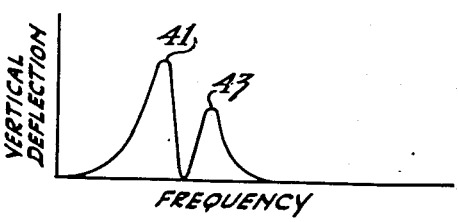

The invention will be described in greater detail by reference to the accompanying drawing of which Figure 1 is a schematic block diagram of a preferred embodiment of a system employing the invention, and Figures 2, 3 and 4 are graphs illustrative of oscillographic indications of the relative response of two microwave resonant devices as a function of the exciting modulated microwave frequency. Similar reference characters are applied to similar elements throughout the drawing.

Referring to Figure 1 of the drawing, a preferred embodiment of the invention as applied to a complete microwave frequency measuring system includes a frequency modulated microwave generator 1 such, for example, as a microwave oscillator of the Klystron or Barkhausen types, which has its frequency modulated over a desired frequency band by means of signals derived from a modulation generator 3 or other low frequency source such as a 60 cycle power line. The modulated microwave signals derived from the generator 1 are coupled through a waveguide system 5 to a cavity resonator 7, the frequency of which is to be determined. The modulated microwave signals from the generator 1 also are coupled through the waveguide system 5 into a standard cavity resonator 9 of which the resonant frequency characteristics have been predetermined. The standard cavity resonator 9 may include a frequency adjusting device such as a tuning screw 11. The frequency band through which the microwave generator 1 is modulated should cover the frequency response bands of both cavity resonators 7 and 9. Relatively loose coupling between the waveguide system 5 and the cavity resonators 7 and 9 is provided by small aperture devices 13 and 15 located in the waveguide system 5 adjacent to the respective cavity resonators.

A first microwave signal detector such, for example, as a crystal 17, is loosely coupled into the first cavity resonator 7 by means of a small coupling loop 19. The crystal detector 17 is terminated by means of a potentiometer 21 having an adjustable contact 23 connected to the input circuit of a low-frequency amplifier 25.

Similarly, a second microwave detector, such as a second crystal 27, is coupled into the standard cavity resonator 9 by means of a second coupling loop 29. The second microwave detector 27 is terminated by a second potentiometer 31 having a movable contact 33 coupled through a phase inverter network 35 (such as an amplifier stage), to the input circuit of a second low-frequency amplifier 37. If desired, the polarity of the second crystal detector 27 may be reversed with respect to that of the first crystal detector 17 and the phase inverter 35 may be omitted. Also the waveguide system 5 and the crystal detectors 17 and 27 may be loosely coupled into the respective cavity resonators by means of conventional wave probes, not shown, instead of by the aperture and coupling loop means described heretofore.

The output circuits of the low-frequency amplifiers 25 and 37 are connected together and connected to the vertical deflecting elements of a conventional cathode ray oscilloscope 39, whereby the vertical deflecting voltage is characteristic of the difference of the magnitudes of the signals detected from the two resonators.

It is essential that the amplifiers 25 and 37, and the phase inverter 35, either cause a negligible time delay of the signals applied to them or else that the amplifier 25 causes a time delay identical with that of the phase inverter 35-amplifier 37 combination. If neither of these alternatives is satisfied a relative displacement on the oscilloscope screen of the signals from detectors 17 and 27 will occur and cause an error in frequency comparison. A simple and convenient way of insuring the absence of time delay is to connect the signals from both detectors to the input of the same amplifier, and apply the output of this amplifier to the vertical deflection system of the oscilloscope.

Sweep potentials for the horizontal deflecting elements of the oscilloscope 39 are derived from the modulation generator 3 whereby the oscilloscope pattern is characteristic of the difference between the detected microwave signals in the two resonators as a function of the modulating voltage applied to the microwave generator.

With some restrictions, the oscilloscope pattern also is a measure of the "response" of the cavity resonator 7 (the square of the absolute magnitude of its impedance) as a function of frequency. These restrictions comprise (1) the coupling into an out of the cavity resonator 7 must be very loose; (2) the microwave detectors must have "square law" characteristics; (3) the band width of the coupling systems must be much greater than that of the cavity resonators; (4) the amplifiers and oscilloscope must not distort the signals applied to them; (5) the generator must have negligible amplitude modulation over a frequency region of several times the band width of the cavity resonators; and (6) the frequency modulation of the microwave generator must be a substantially linear function of the modulating voltage.

The first four requirements may be satisfied quite generally while the last two do not constitute serious difficulties except for very low Q cavities. The wave probe type of coupling suggested heretofore is advantageous for the reason that the only modification of the cavity resonator to be measured is the provision of two small holes in the cavity walls through which the input and output probes may be inserted.

Figure 2 shows the response pattern of two cavity resonators in the oscillographic circuit described by reference to Fig. 1 wherein the resonant characteristics of the unknown cavity resonator and of the reference cavity resonator differ by a relatively wide frequency value. The graph of Figure 3 illustrates, on an expanded scale, the oscilloscope pattern derived when both cavity resonators have substantially identical resonant frequencies. Greatest sensitivity of frequency measurement is obtainable when the Q values of both cavity resonators are of the same order and are relatively high.

The graph of Figure 4, also on an expanded scale as in Fig. 3, shows the oscilloscope pattern when the resonant frequencies of the two cavity resonators differ in frequency by an amount of the order of one part in one million. For example, if the cavity resonators 7 and 9 have Q values of 7,200 and 8,000 respectively, a difference in the resonant frequencies of only one part in a million provides a difference in the amplitudes of the oscillographic peaks 41 and 43 of the order of 25 percent of the peak value 41.

Thus, providing the initial amplitudes of the signals derived from both cavity resonators are carefully balanced by adjustment of the potentiometers 31 and 33, and if phase distortion in the oscillograph circuit is prevented, the accuracy of frequency measurement is limited principally by the calibration accuracy of the secondary frequency standard comprising the standard cavity resonator 9 and the calibration of its tuning screw 11. Since both cavity resonators are excited by a common frequency modulated microwave source, frequency drift in the microwave generator has no objectionable effect upon the accuracy of frequency measurement. Since cavity resonators and resonant lines at present are the most reliable types of microwave secondary frequency standards, the method and system described heretofore comprises an extremely valuable and convenient tool for determining with accuracies of better than one part in a million the difference frequency between such secondary standards and other microwave devices under test.

It should be understood that the method and system disclosed may be modified in accordance with conventional microwave technique to provide similar frequency and impedance measurements of other types of microwave resonant devices. It further should be understood that the particular means for coupling into the cavity resonators disclosed herein are employed purely by way of illustration, and that any other known means may be employed which do not provide objectionable coupling characteristics which would seriously affect the resonant frequency characteristics of either of the cavity resonators.

I claim as my invention:

1. The method of utilizing frequency-modulated signals for comparing the resonant frequencies of a pair of microwave resonant devices comprising the steps of applying to said devices frequency modulated microwave signals extending over a range including the resonant frequencies of said devices, detecting said signals in said devices, combining said detected signals in opposite polarity, and indicating said combined signals as a function of the instantaneous frequency of said applied signals.

2. The method of comparing the resonant frequencies of a pair of microwave resonant devices comprising the steps of generating frequency modulated microwave signals extending over a range including the resonant frequencies of said devices, applying said signals to said devices, detecting said signals in said devices, equalizing said detected signals combining said detected equalized signals in opposite polarity, and indicating said combined signals as a function of the instantaneous frequency of said applied signals.

3. The method of comparing the resonant frequencies of a pair of microwave resonant devices comprising the steps of generating microwave signals, modulating the frequency of said signals to provide a frequency band including the resonant frequencies of said devices, applying said signals to said devices, detecting said signals in said devices, equalizing said detected signals combining said detected equalized signals in opposite polarity, and indicating said combined signals as a function of the instantaneous frequency of said applied signals and the relative magnitudes of said detected signals derived from said devices.

4. Apparatus for comparing the resonant frequencies of a pair of microwave resonant devices, the resonant frequency of one of said devices being a predetermined reference value, including a source of frequency-modulated microwave signals extending over a range including the resonant frequencies of said devices, means for applying said signals to said devices, means for detecting said signals in said devices, means for combining said detected signals in opposite polarity, and means for indicating said combined signals as a function of the instantaneous frequency of said applied signals.

5. Apparatus for measuring the resonant frequency of a first microwave resonant device including a second microwave device having a predetermined resonant frequency, means for generating frequency-modulated microwave signals extending over a range including the resonant frequencies of both of said devices, means for applying said signals to said devices to establish standing waves therein, means for detecting the signal modulation component of said frequency-modulated applied signals in said devices, means for equalizing said detected signals, means for combining said detected equalized signals in opposite polarity, and means for indicating said combined signals as a function of the instantaneous frequency of said applied signals for measuring the resonant frequency of said first device in terms of the known resonant characteristics of said second device.

6. Apparatus for measuring the resonant frequency of a first microwave cavity resonator, including a second microwave cavity resonator having a predetermined resonant frequency, means for generating frequency-modulated microwave signals extending over a range including the resonant frequencies of both of said cavity resonators, means for coupling said modulated signals into both of said resonators, a pair of microwave detectors coupled to said resonators, means for equalizing said detected signals, means for combining in opposite polarity the detected equalized signals, and means for indicating said combined signals as a function of the instantaneous frequency of said applied signals for measuring the resonant frequency of said first resonator in terms of the known characteristics of said second resonator.

7. Apparatus for measuring the resonant frequency of a first microwave cavity resonator, including a second microwave cavity resonator having a predetermined resonant frequency, means for generating frequency - modulated microwave signals extending over a range including the resonant frequencies of both of said cavity resonators, means for coupling said modulated signals into both of said resonators, a pair of microwave detectors coupled to said resonators for detecting said modulated signals, means for equalizing said detected signals, means for combining in opposite polarity said detected equalized signals, and means for indicating said combined signals as a function of the instantaneous frequency of said modulating signals for measuring the resonant frequency of said first resonator in terms of the known characteristics of said second resonator.

8. Apparatus for measuring the resonant frequency of a first microwave cavity resonator, including a second microwave cavity resonator having a predetermined resonant frequency, means for generating frequency - modulated microwave signals extending over a range including the resonant frequencies of both of said cavity resonators, means for coupling said modulated signals into both of said resonators, a pair of microwave detectors coupled to said resonators for detecting said modulated signals, means for equalizing said detected signals, means for combining in opposite polarity said detected equalized signals, and oscillographic means for indicating said combined signals as a function of the instantaneous frequency of said modulated signals for measuring the resonant frequency of said first resonator in terms of the known characteristics of said second resonator.

9. Apparatus for measuring the resonant frequency of a first microwave cavity resonator, including a second microwave cavity resonator having a predetermined resonant frequency, means for generating frequency - modulated microwave signals extending over a range including the resonant frequencies of both of said cavity resonators, means for coupling said modulated signals into both of said resonators, a pair of microwave detectors coupled to said resonators for detecting said modulated signals, means for combining in opposite polarity and in substantially equal magnitude said detected signals, a cathode ray oscilloscope having vertical and horizontal ray deflecting elements for indicating said combined signals as a function of the instantaneous frequency of said modulated signals, means for applying said combined detected signals to said vertical deflecting elements, and means for applying signals of said modulation frequency to said horizontal deflecting elements for measuring the resonant frequency of said first resonator in terms of the known characteristics of said second resonator.

10. A system for comparing the resonant frequencies of a pair of resonant cavities comprising, a microwave oscillator, a modulating signal source coupled to said oscillator repeatedly to vary the frequency thereof over a range including said resonant frequencies, coupling means continuously applying the output of said oscillator to both cavities of said pair, detector means for continuously rectifying the outputs of said cavities, means for equalizing said detected signals, an oscilloscope having two beam-deflection systems, means for continuously combining the rectified equalized outputs of said cavities in opposition to produce a resultant signal whose instantaneous amplitude varies with the oscillator frequency as a function of the difference between the resonant frequencies of said cavities, means for applying said resultant signal to one of said beam-deflection systems, and means for applying the modulating signal to the other of said beam-deflection systems.

11. A method of comparing the resonant frequencies of a pair of resonant cavities which comprises applying a modulating signal to an oscillator repeatedly to vary the frequency thereof over a range including said resonant frequencies, concurrently and continuously applying the output of said oscillator to said pair of cavities, rectifying the outputs of said cavities, equalizing said detected signals continuously combining the rectified equalized outputs of said cavities in opposition to produce a resultant signal whose instantaneous amplitude varies with the oscillator frequency as a function of the difference between said resonant frequencies, and applying said modulating signal and said resultant signal to produce an indication of the amplitude of said resultant signal as a function of the frequency of said oscillator.

ROBERT L. SPROULL.

REFERENCES CITED

The following references are of record in the file of this patent:

UNITED STATES PATENTS

| Number | Name | Date |
| --- | --- | --- |
| 2,252,058 | Bond | Aug. 12, 1941 |
| 2,340,609 | Mestas | Feb. 1, 1944 |
| 2,371,636 | McConnell | Mar. 20, 1945 |
| 2,380,791 | Rosencrans | July 31, 1945 |
| 2,405,814 | Brannin | Aug. 13, 1946 |
| 2,413,939 | Benware | Jan. 7, 1947 |
| 2,483,802 | Bradley | Oct. 4, 1949 |
| 2,498,548 | Howard | Feb. 21, 1950 |